UNITED STATES PATENT OFFICE 2,158,022

VULCANIZATION OF RUBBER

Joy G. Lichty, Stow, Ohio, assignor to Wingfoot Corporation, Wilmington, Del., a corporation of Delaware No Drawing. Application October 2, 1935, Serial No. 43,286

14 Claims. (Cl. 18—53)

This invention relates to a new class of compounds which have been found valuable as accelerators of the vulcanization of rubber when used in conjunction with basic nitrogen-containing accelerators. More particularly, the invention relates to derivatives of mercaptothiazoles which may be called disubstituted carbamyl 1-thiazyl sulphides and may be represented by the formula

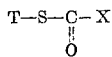

wherein T is a 1-thiazyl radical and X is a secondary amino radical. Another formula illustrating the compounds of the invention is

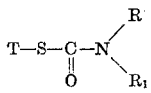

wherein T is a 1-thiazyl radical and the group

is the residue of a secondary amine. Thus, R and $R_1$ may be aliphatic, aralkyl, alicyclic or aromatic radicals such as methyl, ethyl, butyl, phenyl, cyclohexyl, benzyl, beta phenethyl, and the like. They may also represent heterocyclic radicals such as the alpha furfuryl and tetrahydro alpha furfuryl radicals. Still further they may be joined together to form a poly methylene radical which may be substituted by oxygen or sulphur. A more preferred class of compounds of the invention are the disubstituted carbamyl 1-arylene thiazyl sulphides, wherein the arylene group is an ortho arylene radical of the benzene and naphthalene series.

It is an object of this invention to provide a new class of compounds. It is a further object to provide a new class of mercaptothiazole derivatives which are good semi-ultra accelerators of vulcanization when activated by basic nitrogen-containing accelerators, such as diphenylguanidine. Other objects will become apparent as the description of the invention proceeds.

The compounds of the invention are conveniently prepared by reacting a mercaptothiazole, preferably an alkali metal salt thereof, with a disubstituted carbamyl halide. The reaction proceeds with facility and is carried out simply by bringing the mercaptothiazole salt and carbamyl halide together in a liquid medium, preferably with heating. The product is easily purified and is obtained in a high yield. While the alkali metal salts of the mercaptothiazoles are preferred, it is to be understood that other reactive salts of the mercaptothiazoles, such as the ammonium salt, may also be employed. Similarly, the disubstituted carbamyl halide is preferably a chloride, although other halides such as the bromide may be used.

Further illustrating the invention is the preparation of diphenyl carbamyl 1-benzothiazyl sulphide which was prepared by refluxing for 1¾ hours a suspension of 39.7 grams of sodium benzothiazyl mercaptide in a solution of 46.3 grams of diphenyl carbamine chloride in 300 cc. of dry benzene. The product was then cooled and the resulting solid filtered off. This solid was dried and washed with water to remove the sodium salts. Since some of the product dissolves in the benzene medium employed, evaporation of the benzene filtrate gave further solid material. The two solid portions, which were diphenyl carbamyl 1-benzothiazyl sulphide, were combined and were obtained in a yield of 55.7 grams or 77%. The melting point was 130–136° C. When the product was recrystallized from benzene, it was obtained in the form of colorless crystals melting at 151–152° C. Upon analysis it was found to contain an average nitrogen content of 7.77% and an average sulphur content of 17.71%. The theoretical nitrogen and sulphur contents for diphenyl carbamyl 1-benzothiazyl sulphide are, respectively, 7.73% and 17.70%. The equation representing the reaction is as follows:

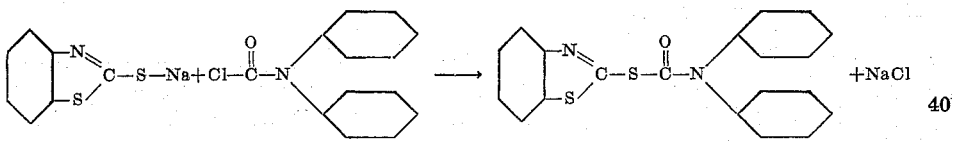

Other mercaptothiazoles, preferably in the form of a water or organic solvent soluble reactive salt thereof, which may be reacted with disubstituted carbamine halides in the practice of the invention are the 1-mercapto naphthothiazoles, alpha and beta, the 1-mercapto xylyl thiazoles, 1-mercapto 4-nitro benzothiazole, 1-mercapto 5-nitro benzothiazole, 1-mercapto 4-chlor benzothiazole, 1-mercapto 3-phenyl benzothiazole, 1-mercapto 3-methyl benzothiazole, 1-mercapto 5-hydroxy benzothiazole, 1-mercapto 3-methoxy benzothiazole, 1-mercapto 5-ethoxy benzothiazole, 1-mercapto 5-amino benzothiazole, 1-mercapto 4-nitro 5-chlor benzothiazole, 1-mercapto 3-methyl 5-nitro benzothiazole, 1-mercapto 3- phenyl thiazole, 1-mercaptothiazole, 1-mercapto 3-4-dimethyl thiazole, and other halogen-, nitro-, hydroxy-, alkoxy-, and amino-substituted arylene mercaptothiazoles.

Similarly, other disubstituted carbamine halides may be reacted with the mercaptothiazoles in the practice of the invention, examples being dimethyl carbamine chloride, diethyl carbamine chloride, dibutyl carbamine chloride, di amyl carbamine chloride, di (o- or p-tolyl) carbamine chloride, dicyclohexyl carbamine chloride, N-ethyl cyclohexyl carbamine chloride, di (o- or p-methyl cyclohexyl) carbamine chloride, dibenzyl carbamine chloride, di (beta phenethyl) carbamine chloride, di (tetra-hydro alpha furfuryl) carbamine chloride, penta methylene carbamine chloride, β β' oxy tetramethylene carbamine chloride, di (o- or p-hydroxy phenyl) carbamine chloride, di (o- or p-phenetidyl) carbamine chloride, di (alpha or beta naphthyl) carbamine chloride, dixylyl carbamine chloride, di (o- or p-anisyl) carbamine chloride, etc. Other illustrative disubstituted carbamyl 1-thiazyl sulphides are dicyclohexyl carbamyl benzothiazyl 1-sulphide, dibutyl carbamyl 1-benzothiazyl sulphide, dibenzyl carbamyl 5-nitro 1-benzothiazyl sulphide, N-ethyl cyclohexyl carbamyl 6-methyl benzothiazyl 1-sulphide, di (p-nitro phenyl) carbamyl 1-benzothiazyl sulphide, and the like.

The compounds to which the invention relates may be employed as accelerators of vulcanization in substantially any of the standard rubber formulae in which basic nitrogen-containing accelerators are present, one found particularly satisfactory being the following:

|  | Parts by weight |
|---|---|
| Extracted pale crepe rubber | 100 |
| Zinc oxide | 5 |
| Sulphur | 3 |
| Stearic acid | 1.5 |
| Diphenylguanidine | 0.2 |
| Accelerator | 0.5 |

Results obtained by the use of this formula are summarized in the following table:

| Cure in mins. at ° F. | Ult. tens in kgs/cm.² | Max. elong. in percent | Modulus in kgs/cm.² at— | |
|---|---|---|---|---|
|  |  |  | 500% | 700% |
| Diphenyl carbamyl 1-benzothiazyl sulphide | | | | |
| 40/285 | 107 | 920 | 11 | 29 |
| 60 | 130 | 860 | 16 | 27 |
| 80 | 139 | 825 | 19 | 62 |
| 120 | 130 | 800 | 21 | 68 |

The novel compounds to which the invention relates thus possess valuable properties as accelerators of vulcanization in conjunction with activators of the nature of basic nitrogen-containing accelerators, of which other examples are diortho tolyl guanidine, 2-4-diamino diphenyl amine, p-p' diamino diphenyl methane, diphenyl guanidine neutral phthalate, butyl ammonium oleate, and the like.

While various specific embodiments of the invention have been described in detail herein, it will be understood that the invention is not limited thereto but that various modifications may be made therein without departing from the spirit of the invention or from the scope of the appended claims.

What I claim is:

1. The process of accelerating the vulcanization of rubber which comprises vulcanizing it in the presence of a basic nitrogen-containing accelerator and diphenyl carbamyl 1-benzothiazyl sulphide.

2. The process of accelerating the vulcanization of rubber which comprises vulcanizing it in the presence of a basic nitrogen-containing accelerator and a diphenyl carbamyl 1-arylene thiazyl sulphide.

3. The process of accelerating the vulcanization of rubber which comprises vulcanizing it in the presence of a basic nitrogen-containing accelerator and a diaryl carbamyl 1-arylene thiazyl sulphide, said aryl and arylene groups being selected from the benzene and naphthalene series.

4. The process of accelerating the vulcanization of rubber which comprises vulcanizing it in the presence of a basic nitrogen-containing accelerator and a compound having the formula

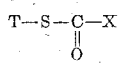

wherein T is a 1-arylene thiazyl radical and X is a diaryl amino radical.

5. A rubber product which has been vulcanized in the presence of a basic nitrogen-containing accelerator and diphenyl carbamyl 1-benzothiazyl sulphide.

6. A rubber product which has been vulcanized in the presence of a basic nitrogen-containing accelerator and a diaryl carbamyl 1-arylene thiazyl sulphide.

7. Diphenyl carbamyl 1-benzothiazyl sulphide.

8. A diaryl carbamyl 1-arylene thiazyl sulphide, said aryl and arylene radicals being selected from the benzene and naphthalene series.

9. The process of accelerating the vulcanization of rubber which comprises vulcanizing it in the presence of a basic nitrogen-containing accelerator and a compound having the formula

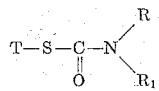

wherein T is a 1-arylene thiazyl radical and

is an amino radical in which R and $R_1$ are selected from the group consisting of aliphatic, aralkyl, alicyclic and aryl radicals.

10. The process of accelerating the vulcanization of rubber which comprises vulcanizing it in the presence of a basic nitrogen-containing accelerator and a compound having the formula

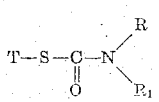

wherein T is a 1-benzothiazyl radical and

is an amino radical in which R and $R_1$ are selected from the group consisting of aliphatic, aralkyl, alicyclic and aryl radicals.

11. A rubber product which has been vulcanized in the presence of a basic nitrogen-containing accelerator and a compound having the formula

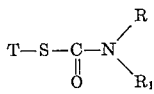

wherein T is a 1-benzothiazyl radical and

is an amino radical in which R and R₁ are selected from the group consisting of aliphatic, aralkyl, alicyclic and aryl radicals.

12. A compound having the formula

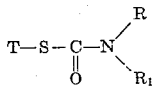

wherein T is a 1-arylene thiazyl radical and

is an amino radical in which R and R₁ are selected from the group consisting of aliphatic, aralkyl, alicyclic and aryl radicals.

13. A compound having the formula

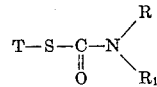

wherein T is a 1-benzothiazyl radical and

is an amino radical in which R and R₁ are selected from the group consisting of aliphatic, aralkyl, alicyclic and aryl radicals.

14. A compound having the formula

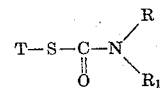

wherein T is a 1-arylene thiazyl radical of the benzene and naphthalene series and

is an amino radical in which R and R₁ are selected from the group consisting of aliphatic, aralkyl, alicyclic and aryl radicals.

JOY G. LICHTY.